United States Patent
Moore

(10) Patent No.: US 10,195,548 B2
(45) Date of Patent: Feb. 5, 2019

(54) FILTER CARTRIDGE WITH INTEGRAL LOCK RING

(71) Applicant: Clarcor Engine Mobile Solutions, LLC, Franklin, TN (US)

(72) Inventor: Jonathan D. Moore, Manchester, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 408 days.

(21) Appl. No.: 14/820,858

(22) Filed: Aug. 7, 2015

(65) Prior Publication Data

US 2016/0038863 A1 Feb. 11, 2016

Related U.S. Application Data

(60) Provisional application No. 62/034,998, filed on Aug. 8, 2014.

(51) Int. Cl.
*B01D 27/08* (2006.01)

(52) U.S. Cl.
CPC ........ *B01D 27/08* (2013.01); *B01D 2201/302* (2013.01); *B01D 2201/4015* (2013.01)

(58) Field of Classification Search
CPC .............. B01D 27/08; B01D 2201/302; B01D 2201/4015; B01D 35/30; B01D 35/005; B01D 35/306; B01D 29/96; B01D 2201/4084
See application file for complete search history.

(56) References Cited

U.S. PATENT DOCUMENTS

| | | | |
|---|---|---|---|
| 2,747,738 A | 5/1956 | Johnson et al. | |
| 5,484,527 A * | 1/1996 | Janik | B01D 27/08 210/232 |
| 5,753,117 A | 5/1998 | Jiang | |
| 5,766,463 A | 6/1998 | Janik et al. | |
| 5,837,137 A | 11/1998 | Janik | |
| 6,006,924 A | 12/1999 | Sandford | |
| 6,136,183 A * | 10/2000 | Suzuki | B01D 27/103 137/512.4 |
| 6,187,188 B1 | 2/2001 | Janik et al. | |
| 6,471,070 B2 | 10/2002 | Janik | |
| 6,740,234 B1 | 5/2004 | Williams et al. | |
| 6,863,811 B2 | 3/2005 | Janik | |
| 6,911,143 B2 | 6/2005 | Janik | |
| 7,303,673 B1 | 12/2007 | Glazewski | |
| 8,057,669 B2 | 11/2011 | Beard et al. | |
| 8,733,555 B2 | 5/2014 | Moore et al. | |
| 9,067,156 B2 | 6/2015 | Moore et al. | |

(Continued)

OTHER PUBLICATIONS

International Search Report and Written Opinion dated Oct. 19, 2015 (PCT/US2015/044200).

*Primary Examiner* — Krishnan S Menon
*Assistant Examiner* — Waqaas Ali
(74) *Attorney, Agent, or Firm* — Alix, Yale & Ristas, LLP

(57) ABSTRACT

A filter cartridge has first and second housing sections joined at a peripheral shoulder to define an interior space. The first housing section includes radially spaced inner and outer side walls connected by a first transition portion to define an annular space. A lock ring is secured to the housing within the annular space. The lock ring includes at least one engagement structure within the annular space.

10 Claims, 3 Drawing Sheets

(56) References Cited

U.S. PATENT DOCUMENTS

| | | |
|---|---|---|
| 2004/0084361 A1 | 5/2004 | Janik et al. |
| 2005/0161378 A1* | 7/2005 | Cline .................. B01D 27/103 210/130 |
| 2006/0062567 A1 | 3/2006 | Reder et al. |
| 2006/0180539 A1 | 8/2006 | Wolf et al. |
| 2009/0078626 A1* | 3/2009 | Krull .................. B01D 27/005 210/94 |
| 2011/0031181 A1 | 2/2011 | Hacker et al. |
| 2013/0220914 A1 | 8/2013 | Hawkins et al. |

\* cited by examiner

FILTER CARTRIDGE WITH INTEGRAL LOCK RING

BACKGROUND OF THE DISCLOSURE

The present disclosure relates to filters, and more particularly, to a filter cartridge for use in a fuel supply system.

Significant quantities of contaminants such as water and assorted abrasive particles may be found in fuel. To remove contaminants and prevent damage to sensitive engine components, fuel supply systems may include one or more filter assemblies configured to remove water and contaminants from the fuel supply. Filter assemblies may include a removable filter cartridge or other element defining a fuel flow path through one or more filter media to remove particulates and separate water from fuel before the fuel is delivered to sensitive engine systems. The filter cartridge or element is configured such that the filter cartridge may be replaced according to maintenance schedules or as needed.

In practice, fuel filtration requirements may vary depending upon: the type and make of the internal combustion engine; the specific application for which the engine is employed; the climate in which the engine operates; and/or regional characteristics as to the quality of the fuel supply. Replaceable filtration components suitable for use in a particular filtration system commonly vary as to capacity, fluid compatibility, water separation, and filtration efficiency.

Traditional fuel filters may utilize any of a variety of configurations to retain a filter cartridge to a filter head. The filter cartridge and filter head may be mated directly at an external diameter of the filter cartridge. Alternatively, the filter cartridge can be secured to the filter head by an external ring surrounding the outside diameter of the filter cartridge.

Connections between a filter cartridge and filter head are required to withstand vibration, shock, and relatively high internal pressure, while accommodating an increasing volume of fuel and cyclical pressure changes which typify modern fuel supply systems.

One of the recurring problems in assuring filtration system performance is encountered in the connection of the filter cartridge to the filter head. It is imperative that the replacement cartridge be compatible with the filtration requirements of the fuel system. Some replacement cartridges are configured to engage the filter head at an outermost diameter. The cartridge is either directly connected to the filter head or indirectly connected to the filter head by a separate ring sliding over the outermost diameter of the cartridge. This kind of peripheral engagement may radially limit the diameter of replacement cartridges, which can limit the size and resulting filtration capacity of the filter media contained within.

There is a need in the art for a filter cartridge that is not radially constrained by the engagement with the filter head and is usable with a variety of previously designed filter heads.

SUMMARY

One embodiment of the disclosed filter cartridge comprises a lock ring incorporated into a filter cartridge configured to accept a mating annular portion of a filter head.

Filter assemblies include a filter head which defines a receptacle for receiving the communication end of a filter cartridge and may include an engagement structure for retaining a received cartridge. When properly received in a filter head, the communication end of a filter cartridge receives the fuel inlet/outlet conduits projecting from the head. Fuel is directed through filter media contained within the cartridge and clean fuel is passed on to the engine.

The present disclosure is directed to a filter cartridge incorporating inwardly directed engagement features that may be in the form of a lock ring. One preferred form of the lock ring is mounted within an annular space at the communication end of the filter cartridge by an interference fit. The annular space includes at least one engagement structure that communicates with the head portion. In another embodiment of the disclosed filter cartridge, the lock ring is mechanically crimped along its outer edge to an interior edge of the filter cartridge. The lock ring may engage the filter head by a threaded or bayonet connection system or the like.

An object of the disclosure is to provide a new and improved connection system for a filter cartridge which provides for the efficient connection to a filter head where the radius of the cartridge is not limited by the connection system. Other objects and advantages of the disclosure will become apparent from the specification and the drawings.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent similar parts throughout the several figures, a filter cartridge 10 incorporates a lock ring 12 in accordance with the present disclosure.

Figure 1:
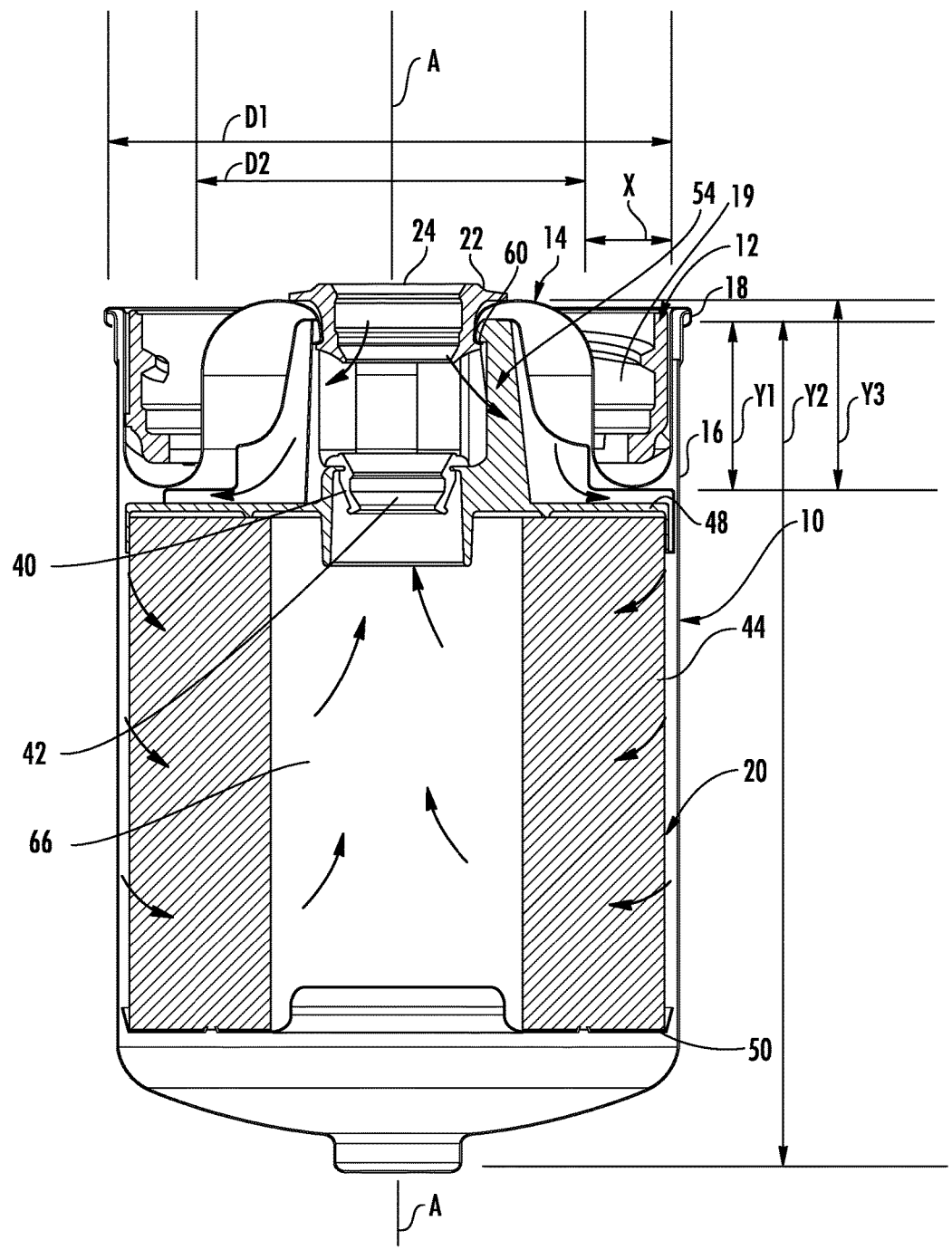
FIG. 1 is a longitudinal sectional view of a first embodiment of a filter cartridge incorporating a lock ring in accordance with the present disclosure.

FIG. 1 is a sectional view through a filter cartridge 10 and a lock ring 12. The filter cartridge comprises a first housing section 14 joined to a second housing section 16 along a peripheral edge 18 to form an interior space 66. The interior space 66 contains a filter element 20 that is supported within the filter cartridge 10. Upper grommet 22 surrounds the fuel inlet port 24 and lower grommet 40 surround the fuel outlet port 42 about longitudinal axis A-A of the filter cartridge. First housing section 14 and upper end cap 48 receive coaxial conduits 51, 52 (see FIG. 3) for delivery of unfiltered fluid and retrieval of filtered fluid from the filter cartridge 10.

Figure 2:
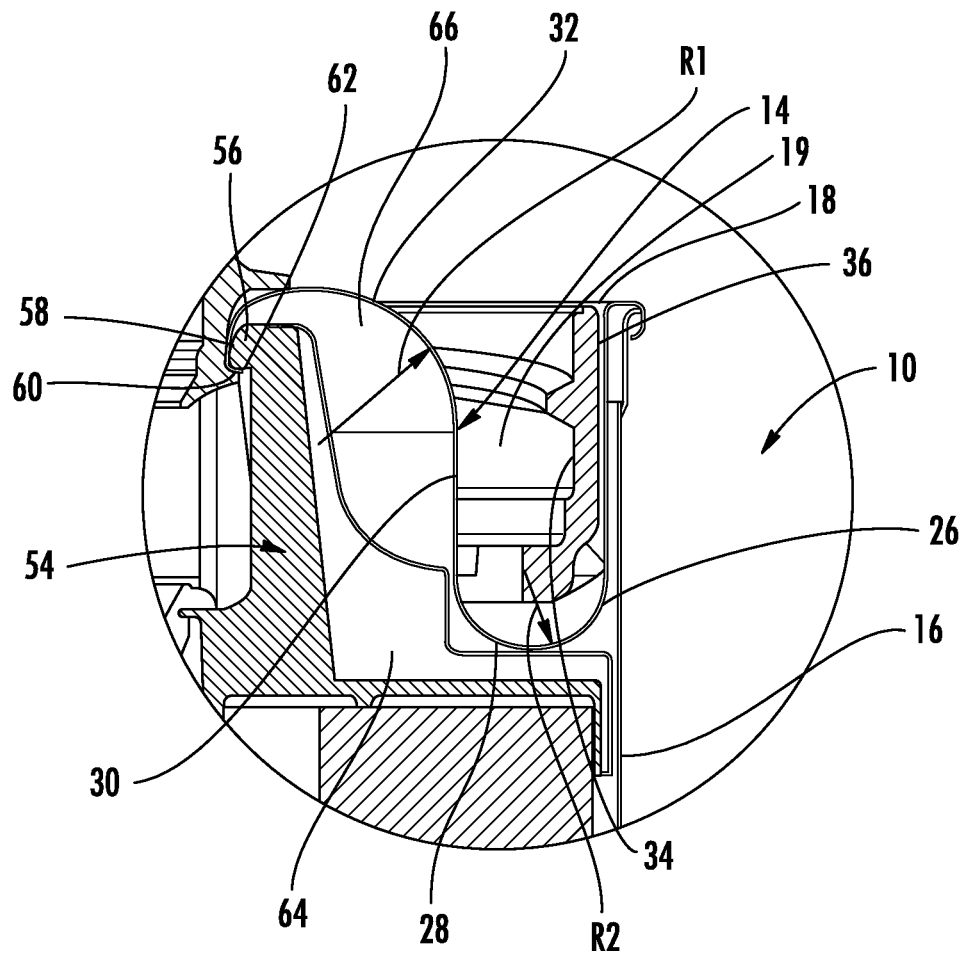
FIG. 2 is an enlarged view of the connection between the filter cartridge and lock ring of FIG. 1.

FIG. 2 illustrates an enlarged view of the connection between filter cartridge 10 and lock ring 12. The first housing section 14 includes outer side wall 26, first transition portion 28, inner side wall 30, and second transition portion 32. The outer side wall 26, first transition portion 28, and inner side wall 30 form an annular space 19 in the filter cartridge to allow for reception of the lock ring 12 interior the peripheral edge 18. In the depicted embodiment, the first transition portion 28 is defined essentially by a radius R2, subtending an obtuse angle and rotated about a point within the annular space 19. The first transition portion 28 is rotated about the longitudinal axis A-A to define a concave three-dimensional torus. In the depicted embodiment, the second transition portion 32 is defined essentially by a radius R1, subtending an obtuse angle and rotated about a point within the interior space 66. The second transition portion 32 is rotated about the longitudinal axis A-A to define a convex three-dimensional torus. The depicted embodiment allows the first housing section 14 to be constructed from a single contiguous sheet of material.

In one embodiment, depicted in FIG. 1, the width X of the annular space 19 is approximately 10% the diameter of the cartridge D1. A wider annular space 19 would result in less interior space 66 but may be necessary depending on the filter head. The aforementioned annular space 19 allows the lock ring 12 to engage the filter head 38 interior the peripheral edge 18 of second housing section 16. The engagement within annular space 19 allows the filter cartridge 10 to extend beyond the peripheral edge 18 in the radial direction.

Referring to FIG. 1, the height of the first housing section 14 relative to the height of the cartridge 10 may differ. In one embodiment, the first housing section first height Y1 is approximately equal to the first housing section third height Y3. In another embodiment, the first housing section first height Y1 is approximately 90% of the first housing section third height Y3. In another embodiment, the first height of the first housing section Y1 may be approximately 20% of the height of the filter cartridge Y2.

Figure 3:
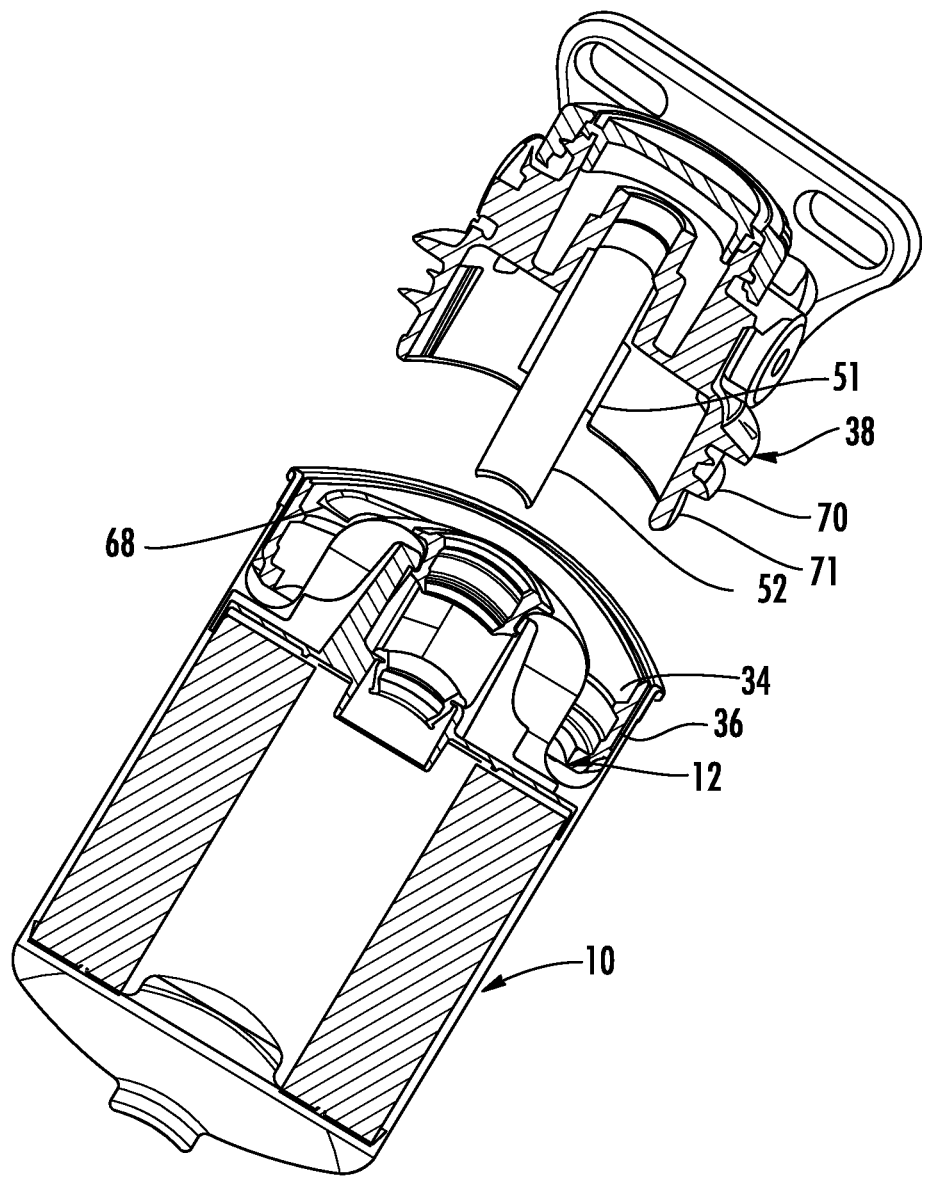
FIG. 3 is an exploded sectional perspective view of a filter assembly including a filter head and a filter cartridge that incorporates a lock ring system in accordance with the present disclosure.

In an embodiment most clearly depicted in FIG. 3, the lock ring 12 preferably has an inner surface 34 and outer surface 36. The inner surface 34 is configured to engage a complementary annular portion of the filter head 38. The filter head 38 has an annular, downwardly projecting skirt 71 that includes outwardly projecting engagement structures 70. The inner surface 34 of lock ring 12 includes inwardly projecting engagement structures 68 complementary to the outwardly projecting engagement structures 70. These complementary engagement structures are configured such that the lock ring 12 engages the filter head 38 when the cartridge is rotated a first direction and disengages when the cartridge is rotated in a second direction opposite the first direction. These complementary engagement structures may comprise a threaded or bayonet connector system or the like. The skirt 71 has a configuration complementary to the annular space 19 in the filter cartridge 10 to allow for reception of the skirt 71 interior the peripheral edge 18.

Referring to FIG. 1, a continuous ring of filter media 44 extends between first (upper) and second (lower) end caps (48 and 50 respectively) of the filter element 20. The filter media 44 may be constructed of cellulose paper or any other permeable fibrous material. As shown in FIGS. 1 and 2, the upper end cap 48 mechanically connects the filter element 20 to the filter cartridge 10. The upper end cap 48 surrounds the fuel outlet port 42 around the longitudinal axis A-A. The fuel outlet port 42 is configured as a receptacle to receive a fuel outlet conduit 52 depicted in FIG. 3, thus allowing filtered fuel to exit the filter cartridge 10.

As depicted in FIGS. 1 and 2, filter element retention arms 54 project axially from the upper end cap 48 at the perimeter of the fuel outlet port 42 and retain the first housing section 14 at annular lip 60. The set of filter element retention arms 54 surround the fuel outlet port 42 in a circle coaxial with the longitudinal axis A-A of the filter cartridge. Depending on the pressure within the filtration environment, the characteristics of the filter element retention arms 54 may be adapted to ensure a more secure connection. As one of skill in the art will appreciate, increasing the width of the arms 54, increasing the thickness of the arms 54, or multiplying the number of arms 54 will increase the retention force the arms can exert on the annular lip 60.

Filter element retention barbs 56 project radially inward from the terminal end of the filter element retention arms 54. In the embodiment illustrated in FIG. 2, the barbs have an engagement ramp 58 oriented towards the annular lip 60 of the first housing section 14. Proceeding from the terminal end of the arms 54 and moving towards the upper end cap 48, the barbs 56 increase in width while traveling along the engagement ramp 58. At the end of the engagement ramp 58 nearest the upper end cap 48 the barbs 56 terminate in a retention ledge 62. The ledge 62 shown in the figures is a flat surface that projects radially from a surface of the arms 54 towards axis A-A adjacent the engagement ramp 58. Like the arms 54, the characteristics of the ledge 62 and the annular lip 60 of the filter cartridge 10 may be altered to provide a more secure connection to the cartridge 10. For example, increasing the length of the ledge 62 and the radial width of the annular lip 60 will increase the retention forces exerted by the barbs 56 on the annular lip 60.

In one embodiment, the barbs 56 may be located on the surface of the retention arms 54 oriented towards a longitudinal axis A-A of filter cartridge 10. Thus, in the configuration of FIGS. 1-3, the ledge 62 projects radially toward the longitudinal axis A-A of filter cartridge 10. In an alternate embodiment, the barbs 56 are located on the surface of the arms 54 oriented away from longitudinal axis of the cartridge A-A (not shown).

As shown in FIGS. 1 and 2, a plurality of support ribs 64 extend radially from the filter element retention arms 54. The support ribs 64 are connected to a surface of the arms 54 facing away from the fuel outlet port 42 and provide biasing forces to aid in retention of the filter element 20 within the filter cartridge 10. In the embodiment illustrated in FIGS. 1 and 2, the support ribs exert forces stiffens the arms. Furthermore, in one embodiment where the ribs 64 extend from the arms 54 to a perimeter of the upper end cap 48, the ribs 64 ensure that the upper end cap 48 is centered within the first housing section 14. By extending beyond the perimeter of the upper end cap 48, the ribs 64 abut the first housing section 14 when installed, which may prevent the upper end cap 48 from moving from side to side within the filter cartridge housing 10.

In one embodiment, the ribs 64 also act to define a plurality of fuel flow pathways. For example, in FIG. 1 the ribs 64 extend past the periphery of upper end cap 48 and abut the inside surface of the first housing section 14. At the periphery, the ribs 64 are axially raised from the upper end cap 48, creating a gap between the upper end cap 48 and the first housing section 14 of the filter cartridge. The ribs 64 define fuel flow paths extending radially outwardly across the upper end cap 48.

Fluid flow through the filter cartridge 10 will now be described, where the fuel flow is indicated with arrows. In the embodiment of the filter cartridge depicted in FIGS. 1 and 3, unfiltered fuel enters the cartridge from the head 38 through fuel inlet port 24. Conduits 51 and 52 are received in grommets 22 and 40, respectively, to define separate flow paths for fuel entering the cartridge and clean fuel leaving the cartridge. Fuel flows radially across the upper end cap 48 through gaps in the filter element retention arms 54, and around the periphery of the upper end cap 48. After flowing around the periphery, fuel flows radially inwardly through the filter media 44, and axially toward the fuel outlet conduit 52. Fuel then flows through fuel outlet port 42 and exits the head 38.

I claim:

1. A fitter cartridge comprising:
   first and second housing sections joined at a peripheral shoulder to define an interior space, said first housing section including radially spaced inner and outer side walls connected by a first transition portion to define an annular space adjacent a first end of said fitter cartridge, said first transition portion defined by a radius of curvature rotated about a point in said annular space, said inner side wall extending from a first end at said first transition portion to a second end at a second transition portion, said second transition portion extending radially inwardly from said inner side wall to define an axial opening in said first housing section, said second transition portion is defined by a radius of curvature rotated about a point within the interior space defined by said first and second housing portions, said second housing portion radially surrounding and joined to said first housing portion;
   a fitter element having first and second end caps secured to opposite axial ends of an annular ring of filter media, said filter media radially overlapping said annular space, said first end cap positioned axially below said annular space and defining a fluid flow opening communicating with a central region surrounded by said ring of filter media;
   a lock ring secured to said housing within said annular space, said lock ring including an outer surface facing said outer side wall and an inner surface, said inner surface including at least one engagement structure projecting radially inwardly within said annular space, wherein said at least one engagement structure comprises a threaded or bayonet connector.

2. The filter cartridge of claim 1, wherein said lock ring is secured to an inner surface of said outer side wall.

3. The filter cartridge of claim 1, wherein said first housing section outer side wall has a first diameter D1, said inner side wall has a second diameter D2, D2 is smaller than D1 and said annular space has a radial dimension X at least approximately 10% of D1.

4. The filter cartridge of claim 1, wherein said first housing section outer side wall has a first diameter D1, said inner side wall has a second diameter D2, and D2 is approximately 70% of D1.

5. The filter cartridge of claim 1, wherein said first transition portion is an annular, U-shaped bend connecting said outer side wall to said inner side wall.

6. The filter cartridge of claim 5, wherein said U-shaped bend is defined by a radius of curvature rotated about a point in said annular space.

7. The filter cartridge of claim 1, wherein said second transition portion terminates at a radially outward projecting lip surrounding said axial opening, said upper end cap includes axially extending fingers having inward projecting teeth engaged to said lip, thereby supporting said filter element within said housing.

8. The filter cartridge of claim 1, wherein said first housing section has a first height Y1, and said fitter cartridge has a second height Y2, and Y1 is approximately 20% of Y2.

9. The filter cartridge of claim 1, wherein said first housing section has a first height Y1, and said first housing section has a third height Y3, and Y1 is approximately 90% of Y3.

10. A filter cartridge comprising:
    first and second housing sections joined at a peripheral shoulder to define an interior space, said first housing section including radially spaced inner and outer side walls connected by a first transition portion to define an annular space adjacent a first end of said filter cartridge, said first transition portion defined by a radius of curvature rotated about a point in said annular space, said inner side wall extending from a first end at said first transition portion to a second end at a second transition portion, said second transition portion extending radially inwardly from said inner side wall to define an axial opening in said first housing section, said second transition portion is defined by a radius of curvature rotated about a point within the interior space defined by said first and second housing portions, said second housing portion radially surrounding and joined to said first housing portion;
    a filter element having first and second end caps secured to opposite axial ends of an annular ring of filter media, said filter media radially overlapping said annular space, said first end cap positioned axially below said annular space and defining a fluid flow opening communicating with a central region surrounded by said ring of filter media;
    a lock ring secured to an inner surface of said first housing section within said annular space, said lock ring including an outer surface and an inner surface within said annular space, said inner surface including at least one radially inwardly projecting engagement structure within said annular space, wherein said at least one engagement structure engages a complimentary engagement structure external to the filter cartridge when the filter cartridge is rotated in a first direction and disengages from said complimentary engagement structure when the filter cartridge is rotated in a second direction opposite the first direction.

\* \* \* \* \*

UNITED STATES PATENT AND TRADEMARK OFFICE
CERTIFICATE OF CORRECTION

PATENT NO. : 10,195,548 B2  
APPLICATION NO. : 14/820858  
DATED : February 5, 2019  
INVENTOR(S) : Jonathan D. Moore Page 1 of 1

It is certified that error appears in the above-identified patent and that said Letters Patent is hereby corrected as shown below:

In the Claims

Column 5, Line 2:  
Delete "fitter" and insert --filter--

Column 5, Line 21:  
Delete "fitter" and insert --filter--

Column 6, Line 8:  
Delete "fitter" and insert --filter--

Signed and Sealed this  
Sixth Day of August, 2019

Andrei Iancu  
*Director of the United States Patent and Trademark Office*